United States Patent [19]

Yon et al.

[11] Patent Number: 4,841,160
[45] Date of Patent: Jun. 20, 1989

[54] POWER SUPPLY SWITCHING CIRCUIT

[75] Inventors: Steven A. Yon, Altamonte Springs; Luis A. Diaz, Apopka, both of Fla.

[73] Assignee: NCR Corporation, Dayton, Ohio

[21] Appl. No.: 278,636

[22] Filed: Dec. 1, 1988

[51] Int. Cl.[4] .............................................. H02J 7/00
[52] U.S. Cl. ...................................... 307/66; 307/64; 307/87; 363/41; 363/97; 365/228; 365/229
[58] Field of Search .................................. 307/64–87; 363/41, 15, 26, 97; 365/226–229; 320/14

[56] References Cited

U.S. PATENT DOCUMENTS

| | | | |
|---|---|---|---|
| 3,414,802 | 12/1968 | Harrigan et al. | 307/44 X |
| 3,699,352 | 10/1972 | Silver | 307/43 X |
| 4,395,639 | 7/1983 | Bring | 307/66 |
| 4,401,895 | 8/1983 | Petkovsek | 307/66 |
| 4,459,651 | 7/1984 | Fenter | 363/97 X |
| 4,558,230 | 12/1985 | Western | 307/66 |
| 4,672,293 | 6/1987 | Crampton | 320/14 |
| 4,694,237 | 9/1987 | Hanson | 320/6 |
| 4,712,196 | 12/1987 | Uesugi | 365/229 |
| 4,729,083 | 3/1988 | Kyriakos | 363/53 |
| 4,760,322 | 7/1988 | Crampton | 320/14 |
| 4,779,007 | 10/1988 | Schlanger et al. | 307/66 |

Primary Examiner—William M. Shoop, Jr.
Assistant Examiner—Paul Ip
Attorney, Agent, or Firm—Wilbert Hawk, Jr.; Stephen F. Jewett; Douglas S. Foote

[57] ABSTRACT

The subject invention is a power supply having an input for receiving a power signal, a DC storage device connected to the input, a primary output connected to the DC storage device and connectable to a battery, a DC to DC converter for converting the voltage at the DC storage device to an auxiliary DC voltage, the converter having a supply voltage input, and a switching circuit. The switching circuit includes first, second and third switches. The first switch is responsive to the power signal for providing the DC storage device voltage to the converter supply voltage input. The second switch is responsive to the voltage on the battery for providing the DC storage device voltage to the converter supply voltage input. The third switch is responsive to an auxiliary voltage on/off signal for overriding the second swtich.

38 Claims, 5 Drawing Sheets

POWER SUPPLY SWITCHING CIRCUIT

The present invention relates to a power supply which provides primary and auxiliary DC voltage to electronic equipment. More particularly, it relates to a switching circuit for controlling the supply of auxiliary DC voltage.

BACKGROUND OF THE INVENTION

Most electronic and computer systems require DC voltage for their operation. Many systems further require more than one DC voltage level. A typical system has a power supply which connects to a standard 110 volt or 220 volt AC line and then converts the AC to one or more DC voltage levels. In order to ensure an uninterrupted supply of power, some systems employ a battery at the primary DC output of the power supply to hold up its level in the event of a loss of AC power. Secondary or auxiliary DC outputs of the power supply do not normally have a battery to hold up their level in the event of a power interruption but receive power from the battery at the primary DC output when AC power fails.

An auxiliary DC output voltage may be provided by a DC to DC converter which may be either an up-switcher or down-switcher circuit depending upon the level of voltage desired at the auxiliary output. Many converters have active electronic elements which require a supply voltage to operate. For example, a converter may employ a pulse width modulator chip which requires a minimum supply voltage to operate.

It is desirable to provide a supply voltage to the converter whenever the power supply is receiving AC power. Furthermore, it is desirable to maintain this supply voltage in the event of an interruption of AC power. However, maintenance of a converter supply voltage must stop if excessive battery discharge would result. Other conditions where it is desirable to discontinue providing supply voltage to the converter when AC power is not available include an improperly installed battery at the DC output and receipt of a control signal from the system.

OBJECTS OF THE INVENTION

It is therefore an object of the present invention to provide a new and improved power supply.

It is another object of the present invention to provide a power supply with a DC to DC converter, having a new and improved switching circuit for providing supply voltage to the converter.

It is a further object of the present invention to provide a switching circuit for a power supply which provides supply voltage to a DC to DC converter whenever AC power is available, but provides supply voltage when AC power is not available only when a storage battery is not unduly discharged, the battery is not installed backwards, and a remote shut-off signal has not been received.

SUMMARY OF THE INVENTION

The present invention is a power supply comprising an input for receiving a power signal, a DC storage device connected to the input, a primary output connected to the DC storage device and connectable to a battery, a DC to DC converter for converting the voltage at the DC storage device to an auxiliary DC voltage, the converter having a supply voltage input, and a switching circuit. The switching circuit includes a first switch responsive to the power signal for providing the DC storage device voltage to the converter supply voltage input. The switching circuit also includes a second switch responsive to the voltage on the battery for providing the DC storage device voltage to the converter supply voltage input.

According to another embodiment, the present invention includes a voltage regulator connected to the DC storage device and a first diode connecting the primary output to the DC storage device. A further form of the invention includes a third switch responsive to an auxiliary voltage on/off signal for overriding the second switch.

DETAIL DESCRIPTION OF THE INVENTION

Figure 1A:
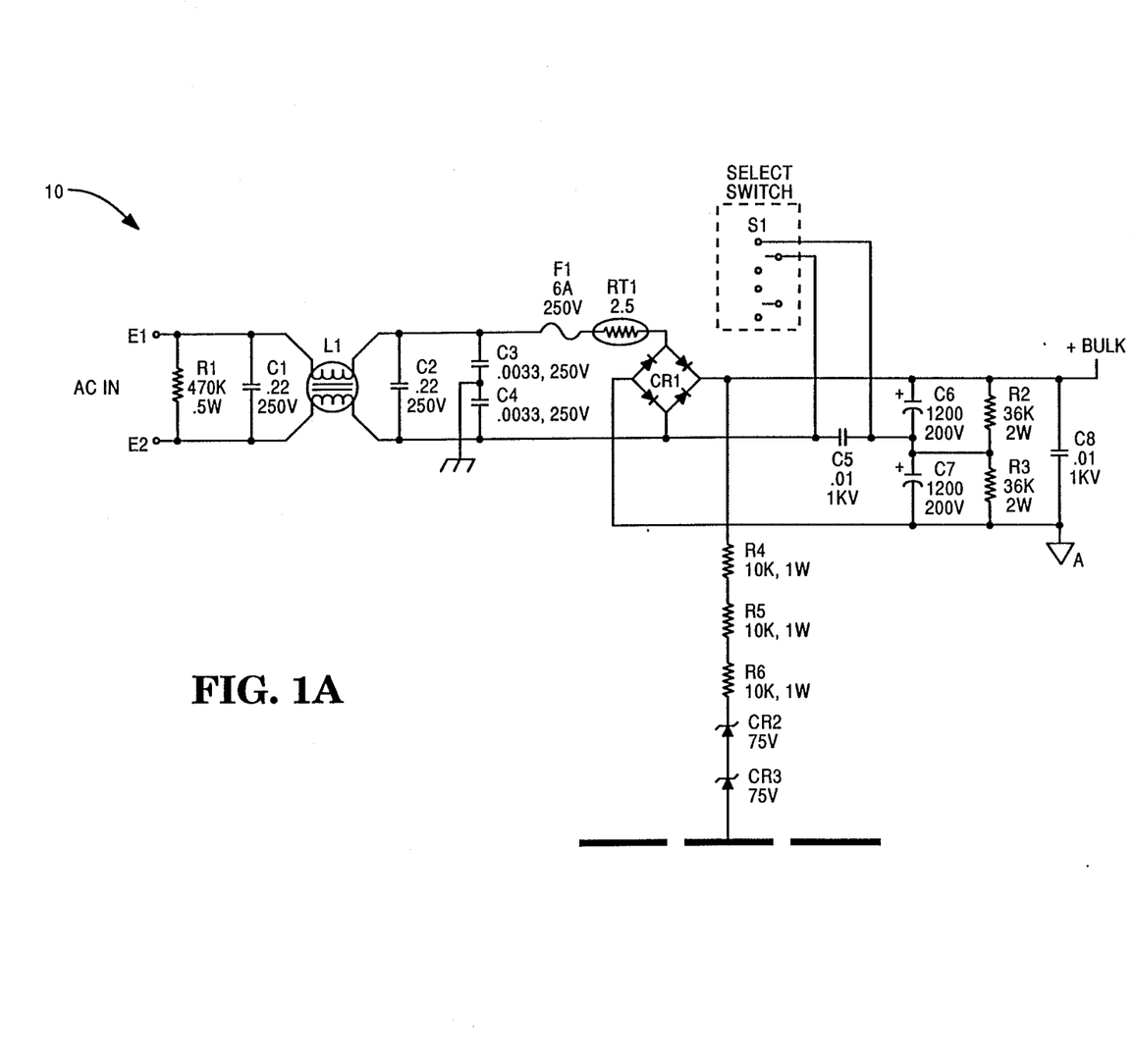
FIGS. 1 and 2 show a circuit diagram of a power supply according to one form of the present invention.

FIGS. 1A, 1B, 2A, 2B and 2C show a switch mode power supply 10 such as may be used to provide DC power to a computer. Referring to FIG. 1A, AC power is received by power supply 10 at input terminals E1 and E2. After being filtered and rectified, a DC voltage appears at +BULK. Switch S1 allows power supply 10 to be configured for either 110 or 220 volts AC input.

Figure 1B:
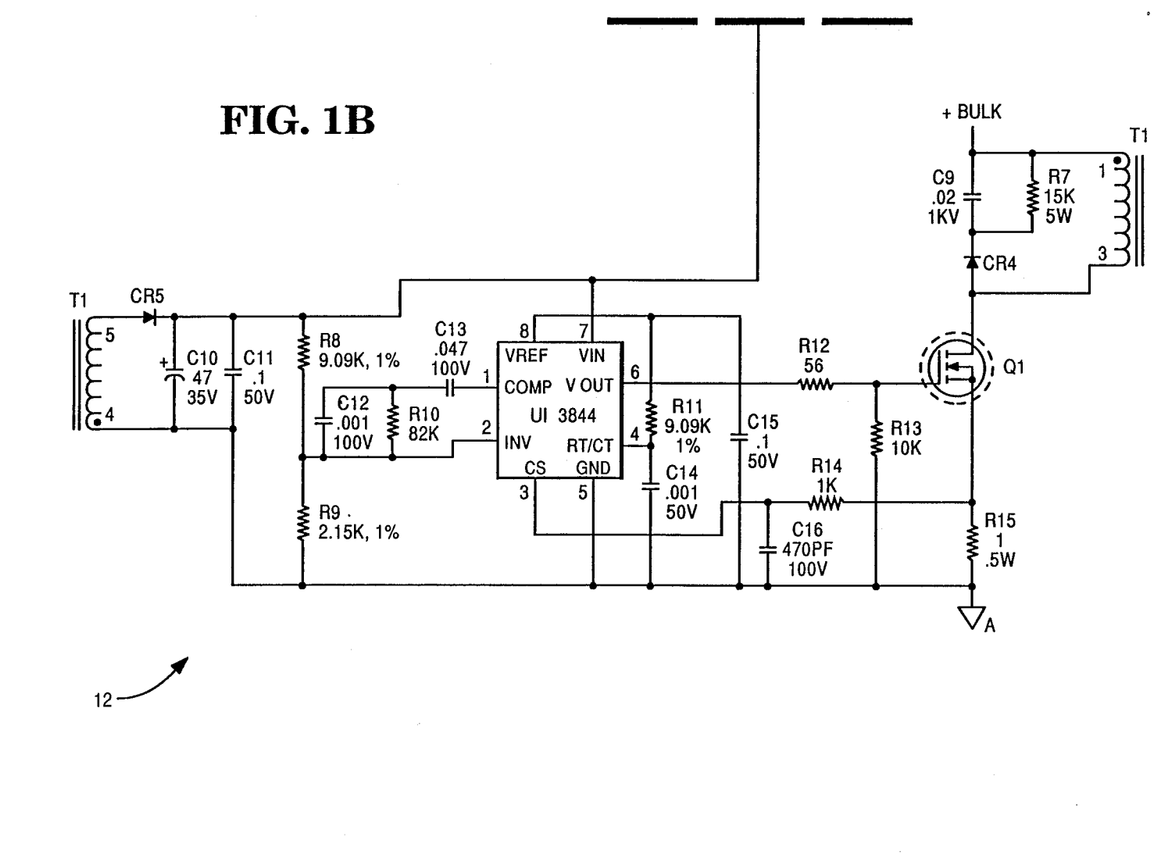

Referring to FIG. 1B, power supply 10 includes a controlled switching circuit 12. A MOS field effect transistor Q1 is turned on and off by a signal on the VOUT output (pin 6) of pulse width modulator chip U1. As Q1 is turned on current flows from +BULK through the primary winding of transformer T1 (pins 1,3). Switching circuit 12 is powered by a tap off of transformer T1 at a secondary winding (pins 4,5). The waveform at transformer T1 (pin 5) will be a square wave which will be filtered to a DC voltage by capacitors C10 and C11 and resistors R8 and R9. This voltage is applied to chip U1 at the VIN input (pin 7). The signal pulse width at VOUT (pin 6) will vary depending upon the magnitude of VIN. In a preferred embodiment with the component values shown, VIN will be regulated to about 13 volts. As VIN increases, the pulse width of the VOUT signal decreases thereby reducing the duty cycle of Q1. Similarly, as VIN decreases, the pulse width of the VOUT signal increases to increase the duty cycle of Q1.

Figures 2, 2B:
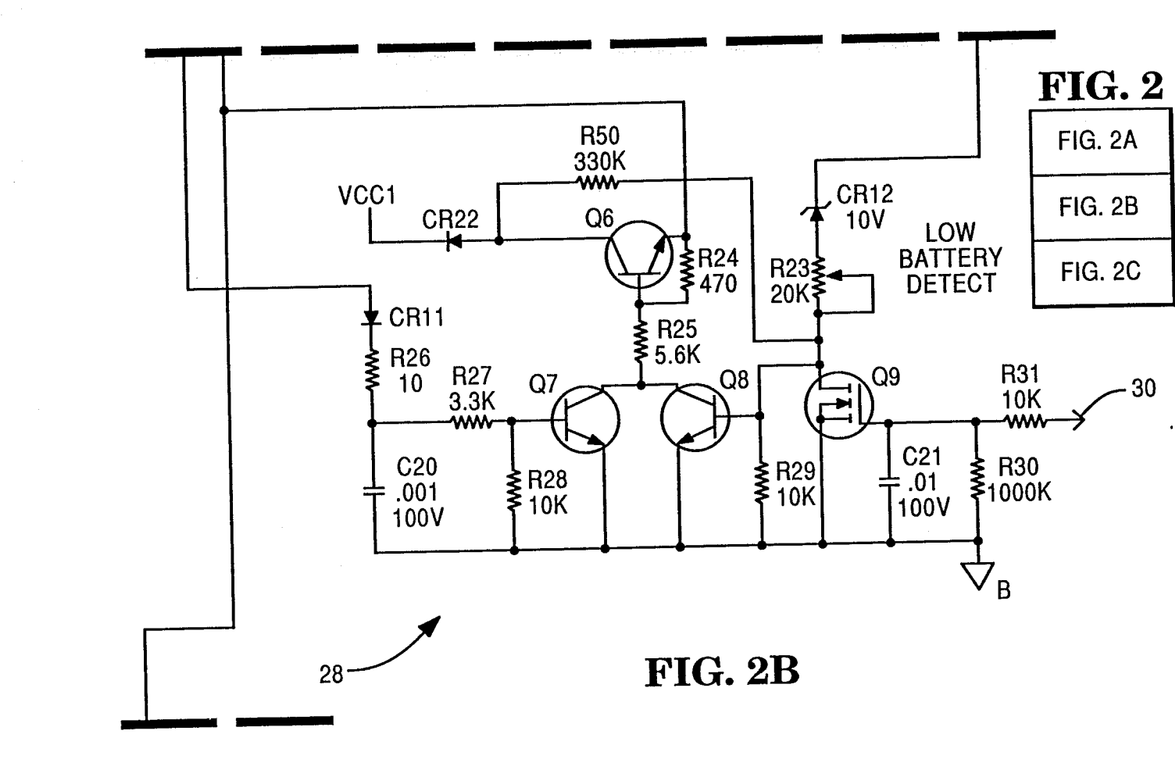
Figure 2A:
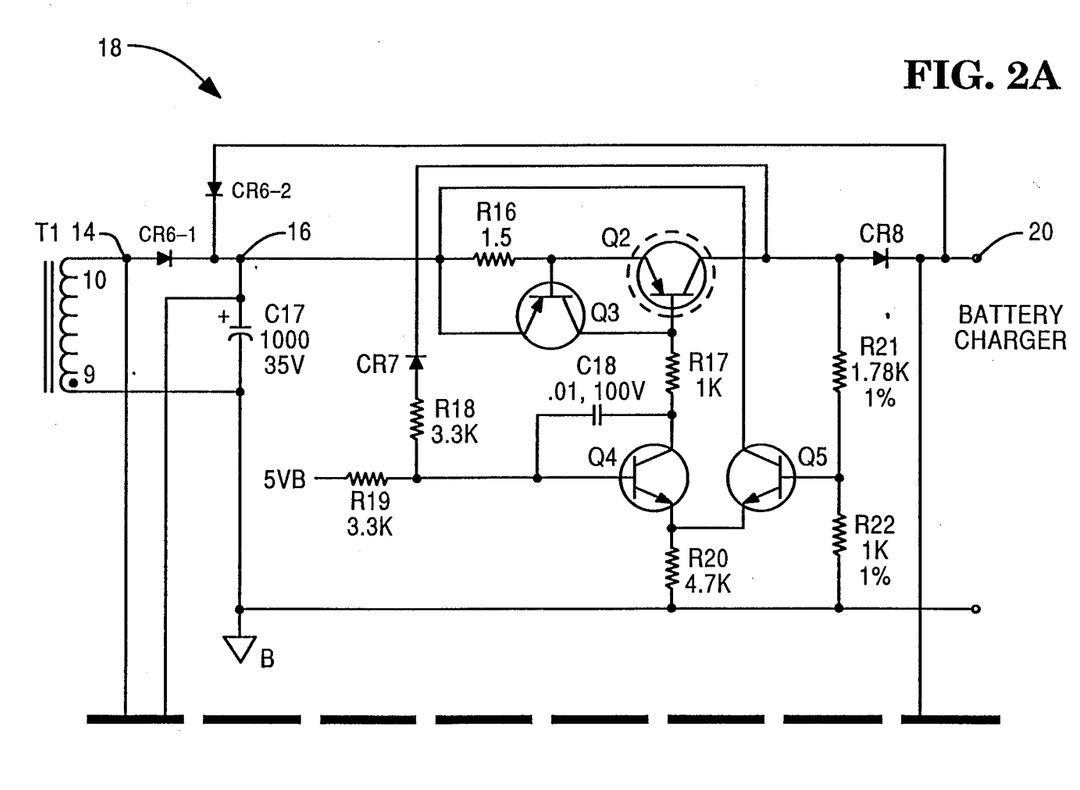

Referring now to FIG. 2A, an input 14 receives a power signal from the secondary winding of transformer T1 (pins 10, 9). The power signal at input 14 will be a square wave with a pulse width controlled by pulse width modulator chip U1. According to a preferred embodiment with the component values shown, the pulse amplitude will be approximately 80 volts. A DC storage device in the form of capacitor C17 is connected to input 14 through a diode CR6-1. Capacitor C17 is connected between a node 16 and a reference potential terminal B which in a preferred embodiment is ground. When a power signal is received on input 14, the charge on capacitor C17 will be approximately 17 volts.

A voltage regulator 18 is connected to capacitor C17 at node 16 and has a primary output 20 which is connectable to a battery (not shown). Voltage regulator 18 includes transistors Q2, Q3, Q4 and Q5, resistors R16, R17, R18, R19, R20, R21 and R22, and capacitor C18, and diodes CR7 and CR8. Resistor R16, transistor Q2 and diode CR8 are connected in series between node 16 and output 20. Resistors R19 and R18 and diode CR7 are connected in series between a 5 volt auxiliary voltage source and the anode of diode CR8. Resistor R17, transistor Q4 and resistor R20 are connected in series between the control electrode of transistor Q2 and reference potential terminal B. Resistors R21 and R22 are connected in series between the anode of diode CR8 and reference potential terminal B. The control electrode of transistor Q4 is connected to junction between resistors R19 and R18, and capacitor C18 is connected between the control electrode of transistor Q4 and the junction between resistor R17 and transistor Q4. Transistor Q3 is connected between node 16 and the control electrode of transistor Q2, and the control electrode of transistor Q3 is connected to the junction between resistor R16 and transistor Q2. Transistor Q5 is connected between node 16 and the junction between transistor Q4 and resistor R20, and the control electrode of transistor Q5 is connected the junction between resistors R21 and R22.

In operation, voltage regulator 18 converts the voltage on capacitor C17, which is nominally charged to 17 volts, to about 13.5 volts DC at output 20. The voltage at the anode of diode CR8 is about 14.5 volts and the voltage at the control electrode of transistor Q5 is about 5 volts. The voltage at the control electrode of transistor Q4 is also about 5 volts from the 5 volt DC reference. The voltage on resistor R20 will about 4.4 volts which keeps transistor Q4 on which in turn keeps transistor Q2 on. If the voltage on the anode of diode CR8 exceeds 14.5 volts, the voltage at the control electrode of Q5 will rise above 5 volts which will force the voltage on resistor R20 above 4.4 volts which will turn Q4 off. When transistor Q4 turns off, transistor Q2 turns off thereby reducing the voltage on output 20.

Transistor Q3 operates as a current limiting switch. When the current through R16 exceeds 250 ma, the voltage drop exceeds 0.6 volts which turns transistor Q3 on. This turns transistor Q2 off thereby limiting current flow therethrough. In the event that the battery is installed backwards (positive and negative terminals reversed), resistor R18 and diode CR7 will pull the control electrode of transistor Q4 to a negative voltage thereby turning transistor Q4 off which turns transistor Q2 off. Capacitor C18 is provided to compensate for small voltage swings in order to prevent oscillation.

FIG. 2A also shows a diode CR6-2 connecting primary output 20 to capacitor C17. As will be discussed more fully hereinafter, diode CR6-2 not only prevents output 20 from being charged by the power signal received on input 14, but in the event of an interruption of AC power at input terminals E1 and E2, it allows capacitor C17 to be charged directly from a battery attached to output 20.

Figure 2C:
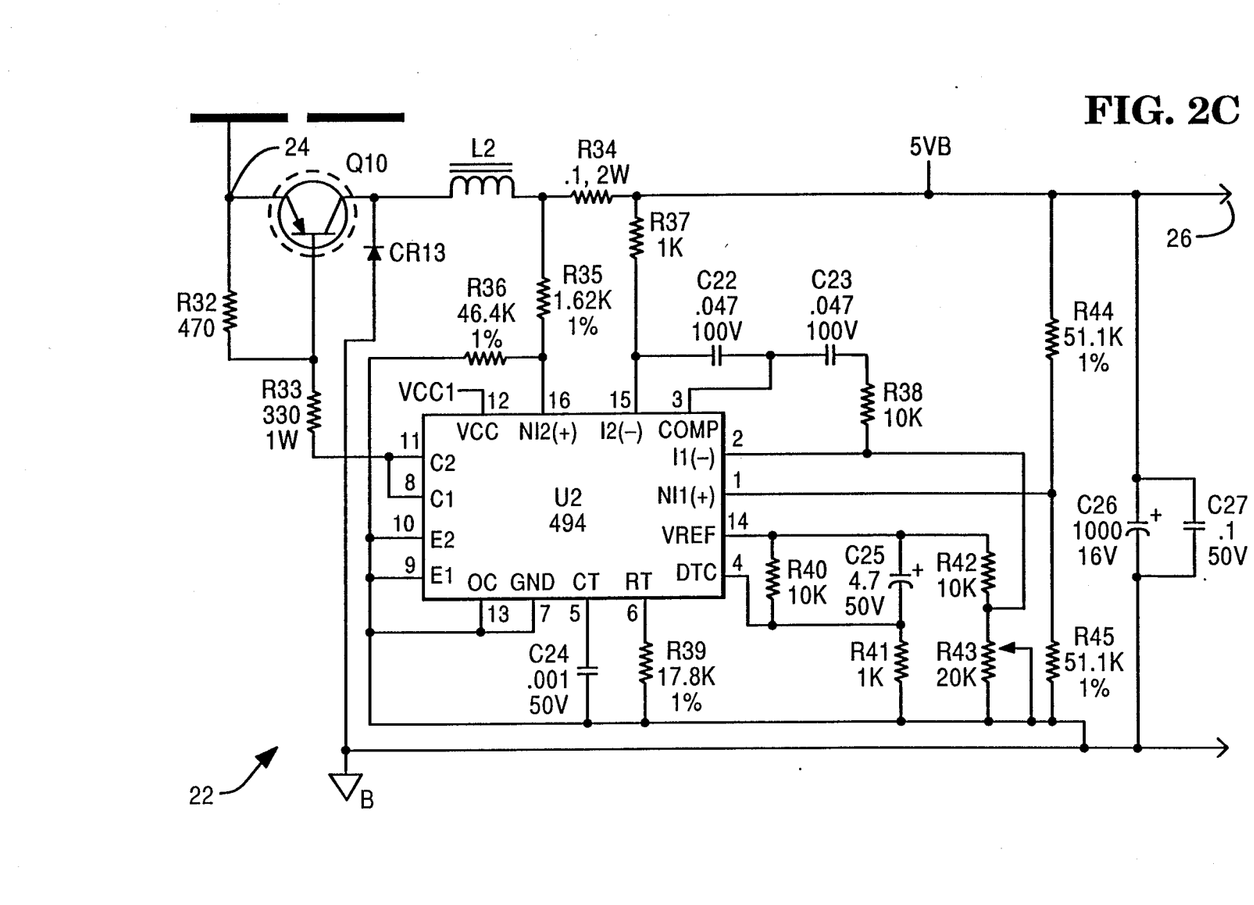

Referring now to FIG. 2C, a DC to DC converter 22 is shown which has an input 24 and output 26. Input 24 is connected to capacitor C17 (See FIG. 2A). Converter 22 converts the DC voltage on capacitor C17 to an auxiliary DC voltage at output 26. In a preferred embodiment, DC to DC converter 22 is a down-switcher which converts the voltage on capacitor C17 to 5 volts DC. Converter 22 includes a pulse width modulator chip U2, transistor Q10, inductor L2, resistors R32, R33, R34, R35, R36, R37, R38, R39, R40, R41, R42, R43, R44 and R45, capacitors C22, C23, C24, C25, C26 and C27, and diode CR13. Transistor Q10, inductor L2 and resistor R34 are connected in series between input 24 and output 26. Resistor R32 is connected between the emitter and base of transistor Q10, and resistor R33 is connected between the base of transistor Q10 and the coupled C2-C1 output (pins 8 and 11) of U2. Resistor R35 is connected between the junction of inductor L2 and resistor R34 and the non-inverting NI2(+) input (pin 16) of U2. Resistor R36 is connected between the non-inverting NI2(+) input (pin 15) of U2 and reference potential terminal B. Resistor R37 is connected between output 26 and the inverting I2(−) input (pin 15) of U2. Capacitor C22, capacitor C23, resistor R38 and resistor R43 are connected in series between the I2(−) input (pin 15) of U2 and reference potential terminal B. The junction between capacitors C22 and C23 is connected to the COMP output (pin 3) of U2, and the junction between resistor R38 and resistor R43 is connected to the inverting I1(−) input of U2. Capacitor C24 is connected between the CT input (pin 5) of U2 and reference potential terminal B. Resistor R39 is connected between the RT input (pin 6) of U2 and reference potential terminal B. Diode CR13 is connected between reference potential terminal B and the junction between transistor Q10 and inductor L2. Resistor R40 and capacitor C25 are connected in parallel between the VREF output (pin 14) and DTC input (pin 4) of U2. Resistor R41 is connected between DTC input (pin 4) of U2 and reference potential terminal B. Resistor R42 is connected between VREF output (pin 14) and inverting I1(−) input (pin 2) of U2. Resistors R44 and R45 are connected in series between output 26 and reference potential terminal B. The junction between resistors R44 and R45 is connected to the noninverting NI1(+) input (pin 1) of U2. Capacitors C26 and C27 are connected in parallel between output 26 and reference potential terminal B. The GND, OC, E1 and E2 connections (pins 7, 13, 9 and 10, respectively) of U2 are connected to reference potential terminal B. Supply voltage VCC1 is provided to supply voltage input VCC of chip U2 to energize DC to DC converter 22. In a preferred embodiment, U2 is a TL494 pulse width modulator chip.

In operation, pulse width modulator chip U2 provides pulses on outputs C1, C2 in response to VCC1 supply voltage applied to U2 and in response to other input signals received by chip U2 which vary the pulse width. Outputs C1 and C2 are the collector electrodes of two on chip transistors (their respective emitter electrodes E1 and E2 are connected to reference potential terminal B). Pulses applied to the control electrode of transistor Q10 allow the DC voltage on capacitor C17 to be pulsed to bulk storage capacitor C26. Inductor L2 and capacitor C26 filter the pulsating DC to provide an output voltage of about 5 volts. Capacitor C27 provides high frequency filtering to prevent transient voltage spikes. In order to regulate the output, resistors R44 and R45 split the 5 volt output to about 2.5 volts which is input to U2 at pin 1. The VREF output of U2 supplies 5 volts which is split to 2.5 volts by resistors R42 and R43. This 2.5 volt reference is input to U2 at pin 2. Pins 1 and 2 are noninverting and inverting inputs to an on chip op amp, the output of which drives the on chip transistors with the C1 and C2 outputs. As the down-switcher output voltage increases above 5 volts, the NI1(+) input will increase above 2.5 volts. This will reduce the pulse width of the signals output from C1 and C2 thereby lowering the down-switcher output voltage. Similarly, if the output voltage drops below 5 volts, the NI1(+) input will decrease below 2.5 volts, thereby increasing the pulse width of the signals on C1 and C2 and raising the down-switcher output voltage.

Resistors R34, R35, R36 and R37 provide overcurrent protection to the down-switcher. The voltage at pin 15 is about 5 volts. When the current through R34 reaches 1.8 amperes, the voltage on pin 16 will exceed 5 volts. Pins 15 and 16 form the inverting and noninverting inputs, respectively, to an on chip op amp, the output of which drives the on chip transistors with the C1 and C2 outputs. As the NI2(+) input increases above 5 volts, the pulse width of the signals output from C1 and C2 are reduced thereby lowering the current through resistor R34. Capacitors C22 and C23 and resistor R38 provide compensation for the op amp inputs thereby improving stability. The DTC input provides dead time control for the pulses output by U2. At start up, the voltage on resistor R41 will be the same as VREF or about 5 volts. This will maximize the dead time between output pulses thereby preventing an overshoot condition. As the voltage on capacitor C25 builds, the voltage on resistor R41 will approach that of the reference potential terminal B, zero volts. This will provide the minimum dead time achievable by DTC. Resistor R39 and capacitor C24 set the oscillation frequency of U2.

FIG. 2B shows a switching circuit 28 for providing voltage from capacitor C17 (see FIG. 2A) to supply voltage VCC1 input of converter 22 (see FIG. 2C) during predetermined operating conditions. Switching circuit 28 comprises three switches. The first switch includes transistors Q6 and Q7 which are responsive to the power signal on input 14 for providing capacitor C17 voltage to VCC1. The second switch includes transistors Q6 and Q8 which are responsive to the battery voltage at primary output 20 for providing capacitor C17 voltage to VCC1. The third switch includes transistor Q9 which is responsive to an auxiliary voltage on/off signal received by input terminal 30 for overriding the second switch. In addition to transistors Q6, Q7, Q8 and Q9, switching circuit 28 includes resistors R23, R24, R25, R26, R27, R28, R29, R30 R31 and R50, capacitors C20 and C21, diodes CR11 and CR22, and zener diode CR12. Transistor Q6 is connected between capacitor C17 (FIG. 2A) More specifically, transistor Q6 is connected between capacitor C17 and the cathode of diode CR22, the anode of diode CR22 is connected to converter supply voltage input VCC1. Resistor R25 and transistor Q7 are connected in series between the control electrode of transistor Q6 and reference potential terminal B. Resistor R24 is connected between capacitor C17 and the control electrode of transistor Q6. In a preferred embodiment, transistor Q6 is a PNP bipolar transistor with its emitter connected to capacitor C17, its collector connected to VCC1 and its base connected to resistors R24 and R25. Diode CR11, resistor R26, and resistor R27 are connected in series between input 14 and the control electrode of transistor Q7. In this manner, the control electrode of transistor Q7 receives the power signal from input 14. Capacitor C20 is connected between the junction of resistors R26 and R27 and reference potential terminal B. Resistor R28 is connected between the control electrode of transistor Q7 and reference potential terminal B. In a preferred embodiment, transistor Q7 is an NPN bipolar transistor with its collector connected to resistor R25, its base connected to resistors R27 and R28, and its emitter connected to reference potential terminal B.

Resistor R25 and transistor Q8 are connected in series between the base of transistor Q6 and reference potential terminal B. Resistor R23 and zener diode CR12 are connected in series between the control electrode of transistor Q8 and primary output 20. Resistor R29 is connected between the control electrode of transistor Q8 and the reference potential terminal B. Thus, depending upon the voltage on primary output 20 relative to the breakdown voltage of zener diode CR12, the control electrode of transistor Q8 will receive a signal from either primary output 20 or reference potential terminal B. In a preferred embodiment, transistor Q8 is an NPN bipolar transistor with its collector connected to resistor R25 and the collector of transistor Q7, its emitter connected to reference potential terminal B, and its base connected to the junction between resistors R23 and R29. Also in a preferred embodiment, resistor R23 is a variable resistor so that the zener knee of zener diode CR12 may be adjusted for low current. Resistor R50 is connected between the control electrode of transistor Q8 and the collector electrode of transistor Q6.

Transistor Q9 is connected between the control electrode of transistor Q8 and reference potential terminal B. Resistor R31 is connected between input terminal 30 and the control electrode of transistor Q9. In this manner, the control electrode of transistor Q9 receives the on/off signal from input terminal 30. Capacitor C21 and resistor R30 are connected in parallel between the control electrode of transistor Q9 and reference potential terminal B. In a preferred embodiment, transistor Q9 is an enhancement type, N channel MOS field effect transistor with its drain connected to the base of transistor Q8, its source connected to reference potential terminal B and its gate connected to resistors R30 and R31, and capacitor C21.

In operation, when a power signal is received by input 14, capacitor C17 will store a DC charge. In a preferred embodiment, this will be about 17 volts. The power signal on input 14 will also charge capacitor C20 through diode CR11 and resistor R26. The voltage on capacitor C20 will bias NPN transistor Q7 on thereby providing a connection between the base of transistor Q6 and reference potential terminal B. With reference potential terminal B at ground, PNP transistor Q6 will be biased on thereby providing the voltage on capacitor C17 to VCC1. Pulse width modulator chip U2 of down-switcher 22 (see FIG. 2C) being powered up by this supply voltage will convert the 17 volts of capacitor C17 appearing at input 24 to 5 volts at output 26. Resistors R27 and R28 provide a high resistance discharge path for capacitor C19 to reference potential terminal B. It should be noted that as long as a power signal appears on input 14, down-switcher 22 will provide an auxiliary output and the states of transistors Q8 and Q9 are irrelevant.

When a power signal is no longer received by input 14, capacitor C20 will discharge through resistors R27 and R28. This will pull the base of transistor Q7 low thereby shutting off transistor Q7. However, if a battery has been properly connected to output 20 and if its DC voltage exceeds the breakdown voltage of zener diode CR12 the voltage applied to the base of transistor Q8 will be sufficient to turn transistor Q8 on. This provides a connection from reference potential terminal B to the base of transistor Q6 which turns Q6 on, thereby providing the voltage on capacitor C17 to VCC1. It will be noted that in a preferred embodiment, the DC voltage on primary output 20 (also the connected battery) will be about 13.5 volts. Thus, the voltage on capacitor C17 will be maintained at about 12.5 volts through diode CR6-2 (see FIG. 2A). 12.5 volts is a sufficient supply voltage to power down-switcher 22 through VCC1. Down-switcher 22 will also convert 12.5 volts appearing at its input 24 to about 5 volts at output 26.

Assuming still that no power signal is received on input 14, there are four conditions under which switching circuit 28 will disconnect capacitor C17 from down-switcher 22. First, if no battery has been connected to primary output 20, the base of transistor Q8 will be pulled to reference potential terminal B thereby shutting off transistor Q8 and consequently transistor Q6.

Second, if a battery has been connected backwards to primary output 20, transistors Q8 and Q6 will be shut off. In this case, diode CR22 protects pulse width modulator chip U2 (FIG. 2C). U2 has an internal connection between its GND (pin 7) and VCC (pin 12). The small current transistor Q6 conducts when shut off would be enough to pull VCC to GND which would destroy U2. Diode CR22 effectively prevents such leakage current.

Third, if a battery has been properly connected to primary output 20 but the battery has been discharged below a predetermined low voltage limit which is below the breakdown voltage of zener diode CR12, transistors Q8 and Q6 will be similarly shut off. It should be noted that in the event that this predetermined limit is reached, the leakage current through zener diode CR12 and resistors R20 and R29 will be very small (less than 50 microamps). This will produce a very small battery drain thereby protecting the battery from any deep-discharge damage. Resistor R50 provides hysteresis for the low battery cutoff voltage to prevent on/off oscillations. This occurs because resistor R50 provides a path to reference terminal B through chip U2. Thus, resistor R50 is connected in parallel to resistor R29 when transistor Q6 is turned off. This lower resistance effectively raises the turn on voltage of Q8 thereby preventing oscillations.

Fourth, a signal received on input terminal 30 can override the second switch of transistors Q8 and Q9. For example, a high voltage (off) signal on input 26 turns Q9 on which connects the base of transistor Q8 to reference potential terminal B, thereby overriding transistor Q8 and shutting transistors Q8 and Q6 off. A low voltage (on) signal on input 26 turns Q9 off which allows transistor Q8 to be controlled by the voltage on primary output 20. Resistors R31 and R30 and capacitor C21 provide noise suppression. The on/off signal may be provided by any remote sensing device for controlling the auxiliary voltage.

The following Table 1 provides preferred component values for transistors Q1-Q10 according to the embodiment shown and described herein.

TABLE 1

| TRANSISTOR | VALUE |
| --- | --- |
| Q1 | BUZ80A |
| Q2 | 2N6107 |
| Q3 | 2N3906 |
| Q4 | 2N3904 |
| Q5 | 2N3904 |
| Q6 | 2N3906 |
| Q7 | 2N3904 |
| Q8 | 2N3904 |
| Q9 | BS170 |
| Q10 | TIP117 |

The following Table 2 provide preferred component values for the specified diodes according to the embodiment shown and described herein.

TABLE 2

| DIODE | VALUE |
| --- | --- |
| CR4 | 1N4946 |
| CR5 | 1N4942 |
| CR6 | MUR620CT |
| CR7 | 1N4148 |
| CR8 | 1N4002 |
| CR11 | 1N4148 |
| CR13 | 5 A, 500 V |
| CR22 | 1N4942 |

It will be clear to those skilled in the art that the present invention is not limited to the specific embodiment disclosed and illustrated herein. It will be understood that the element values shown in the drawings are illustrated by way of example only and these values are not to be construed as limitations to the present invention. Numerous modifications, variations, and full and partial equivalents can be undertaken without departing from the invention as limited only by the spirit and scope of the appended claims.

What is desired to be secured by Letters Patent of the United States is as follows:

1. A power supply comprising:
   an input for receiving a power signal;
   a DC storage device connected to said input;
   a voltage regulator connected to said DC storage device and having a primary output connectable to a battery;
   a first diode connecting said primary output to said DC storage device;
   a DC to DC converter for converting the voltage at said DC storage device to an auxiliary DC voltage, said converter having a supply voltage input; and
   a switching circuit including:
      a first switch responsive to said power signal for providing said DC storage device voltage to said converter supply voltage input;
      a second switch responsive to the voltage on said battery for providing said DC storage device voltage to said converter supply voltage input; and
      a third switch responsive to an auxiliary voltage on/off signal for overriding said second switch.

2. The power supply of claim 1 wherein said first switch comprises first and second transistors, said first transistor connecting the control electrode of said second transistor to a reference potential terminal, the control electrode of said first transistor connected between said power supply input and said reference potential terminal, and said second transistor being connected between said DC storage device and said converter supply voltage input.

3. The power supply of claim 1 wherein said second switch comprises second and third transistors, said third transistor connecting the control electrode of said second transistor to a reference potential terminal, the control electrode of said third transistor connected between said primary output and said reference potential terminal, and said second transistor being connected between said DC storage device and said converter supply voltage input.

4. The power supply of claim 3 wherein said third switch comprises a fourth transistor connected between the control electrode of said third transistor and said reference potential terminal, the control electrode of said fourth transistor receiving said on/off signal.

5. The power supply of claim 4 further comprising:

a first capacitor an first resistor connected in parallel between said fourth transistor control electrode and said reference potential terminal;

an input terminal for receiving said on/off signal; and a second resistor connected between said input terminal and the control electrode of said fourth transistor.

6. The power supply of claim 5 wherein said fourth transistor is a field effect transistor with its drain connected to the control electrode of said third transistor, its source connected to said reference potential terminal and its gate connected to said second resistor.

7. The power supply of claim 3 further comprising:
a third resistor and zener diode series connected between the control electrode of said third transistor and said primary output.

8. The power supply of claim 7 wherein the breakdown voltage of said zener diode is equal to a predetermined low voltage limit on said battery.

9. The power supply of claim 7 wherein said third resistor is a variable resistor.

10. The power supply of claim 3 further comprising:
a fourth resistor connected between the control electrode of said third transistor and said reference potential terminal.

11. The power supply of claim 10 wherein said second transistor has emitter, collector and base electrodes with said emitter electrode connected to said DC storage device, said collector electrode connected to said converter supply voltage input and said base electrode connected to said first transistor, said power supply further comprising:
a tenth resistor connected between the control electrode of said third transistor and the collector electrode of said second transistor.

12. The power supply of claim 2 further comprising:
a fifth resistor connected between said first transistor and the control electrode of said second transistor.

13. The power supply of claim 12 further comprising:
a sixth resistor connected between the control electrode of said second transistor and said DC storage device.

14. The power supply of claim 13 wherein said first transistor has emitter, collector and base electrodes with said emitter electrode connected to said reference potential terminal and said collector electrode connected to said fifth resistor.

15. The power supply of claim 14 further comprising:
a seventh resistor connected between said base electrode and said reference potential terminal; and
an eighth resistor and second capacitor, said eighth resistor connected between said base electrode and said second capacitor, and said second capacitor connected between said eighth resistor and said reference potential terminal.

16. The power supply of claim 15 further comprising a second diode and ninth resistor series connected between said power supply input and the connection between said eighth resistor and second capacitor.

17. The power supply of claim 3 further comprising:
a fifth resistor connected between said third transistor and the control electrode of said second transistor.

18. The power supply of claim 17 wherein said third transistor has emitter, collector and base electrodes with said emitter electrode connected to said reference potential terminal and said collector electrode connected to said fifth resistor.

19. The power supply of claim 1 wherein said DC to DC converter is a down-switcher.

20. The power supply of claim 1 further comprising:
a third diode connected between said power signal input and said DC storage device.

21. The power supply of claim 1 wherein said DC storage device is a capacitor.

22. The power supply of claim 3 further comprising:
a fourth diode connected between said second transistor and said converter supply voltage input.

23. A power supply comprising:
an input for receiving a power signal;
a DC storage device connected to said input;
a voltage regulator connected to said DC storage device and having a primary output connectable to a battery;
a first diode connecting said primary output to said DC storage device;
a DC to DC converter for converting the voltage at said DC storage device to an auxiliary DC voltage, said converter having a supply voltage input; and
a switching circuit including:
a first switch having a first and a second transistor, said first transistor connecting the control electrode of said second transistor to a reference potential terminal, the control electrode of said first transistor connected between said power supply input and said reference potential terminal, and said second transistor being connected between said DC storage device and said converter supply voltage input;
a second switch having said second and a third transistor, said third transistor connecting the control electrode of said second transistor to a reference potential terminal, the control electrode of said third transistor connected between said primary output and said reference potential terminal; and
a third switch responsive to an auxiliary voltage on/off signal for overriding said second switch, said third switch having a fourth transistor connected between the control electrode of said third transistor and said reference potential terminal, the control electrode of said fourth transistor receiving said on/off signal.

24. The power supply of claim 23 further comprising:
a third resistor and zener diode series connected between the control electrode of said third transistor and said primary output, wherein the breakdown voltage of said zener diode is equal to a predetermined low voltage limit on said battery and said third resistor is a variable resistor.

25. The power supply of claim 24 further comprising:
a fifth resistor connected between said first transistor and the control electrode of said second transistor; and
a sixth resistor connected between the control electrode of said second transistor and said DC storage device.

26. The power supply of claim 25 wherein said second transistor has emitter, collector and base electrodes with said emitter electrode connected to said DC storage device, said collector electrode connected to said converter supply voltage input and said base electrode connected to said first transistor, said power supply further comprising:

a tenth resistor connected between the control electrode of said third transistor and the collector electrode of said second transistor.

27. The power supply of claim 26 further comprising:
a fourth diode connected between the collector of said second transistor and said converter supply voltage input.

28. The power supply of claim 27 wherein said first transistor has emitter, collector and base electrodes with said emitter electrode connected to said reference potential terminal and said collector electrode connected to said fifth resistor, and wherein said third transistor has emitter, collector and base electrodes with said emitter electrode connected to said reference potential terminal and said collector electrode connected to said fifth resistor.

29. The power supply of claim 28 further comprising:
a fourth resistor connected between the base electrode of said third transistor and said reference potential terminal.

30. The power supply of claim 29 further comprising:
a seventh resistor connected between the base electrode of said first transistor and said reference potential terminal;
an eighth resistor and second capacitor, said eighth resistor connected between the base electrode of said first transistor and said second capacitor, and said second capacitor connected between said eighth resistor and said reference potential terminal; and
a second diode and ninth resistor series connected between said power signal input and the connection between said eighth resistor and second capacitor.

31. The power supply of claim 30 wherein said fourth transistor is a field effect transistor with its drain connected to the base electrode of said third transistor and its source connected to said reference potential terminal, said power supply further comprising:
a first capacitor and first resistor connected in parallel between the gate of said fourth transistor and said reference potential terminal;
an input terminal for receiving said on/off signal; and
a second resistor connected between said input terminal and the gate of said fourth transistor.

32. The power supply of claim 31 wherein said DC storage device is a third capacitor, and wherein said power supply further comprises:
a third diode connected between said power signal input and said third capacitor.

33. The power supply of claim 32 wherein said DC to DC converter is a down-switcher.

34. A power supply comprising:
an input for receiving a power signal;
a DC storage device connected to said input;
a primary output connected to said DC storage device and connectable to a battery;
a DC to DC converter for converting the voltage at said DC storage device to an auxiliary DC voltage, said converter having a supply voltage input; and
a switching circuit including:
a first switch responsive to said power signal for providing said DC storage device voltage to said converter supply voltage input; and
a second switch responsive to the voltage on said battery for providing said DC storage device voltage to said converter supply voltage input.

35. The power supply of claim 34 wherein said first switch comprises first and second transistors, said first transistor connecting the control electrode of said second transistor to a reference potential terminal, the control electrode of said first transistor connected between said power power supply input and said reference potential terminal, and said second transistor being connected between said DC storage device and said converter supply voltage input.

36. The power supply of claim 34 wherein said second switch comprises second and third transistors, said third transistor connecting the control electrode of said second transistor to a reference potential terminal, the control electrode of said third transistor connected between said primary output and said reference potential terminal, and said second transistor being connected between said DC storage device and said converter supply voltage input.

37. The power supply of claim 34 wherein said switching circuit further comprises:
a third switch responsive to an auxiliary voltage on/off signal for overriding said second switch.

38. The power supply of claim 37 wherein said third switch comprises a fourth transistor connected between the control electrode of said third transistor and said reference potential terminal, the control electrode of said fourth transistor receiving said on/off signal.

* * * * *